Figure 1:
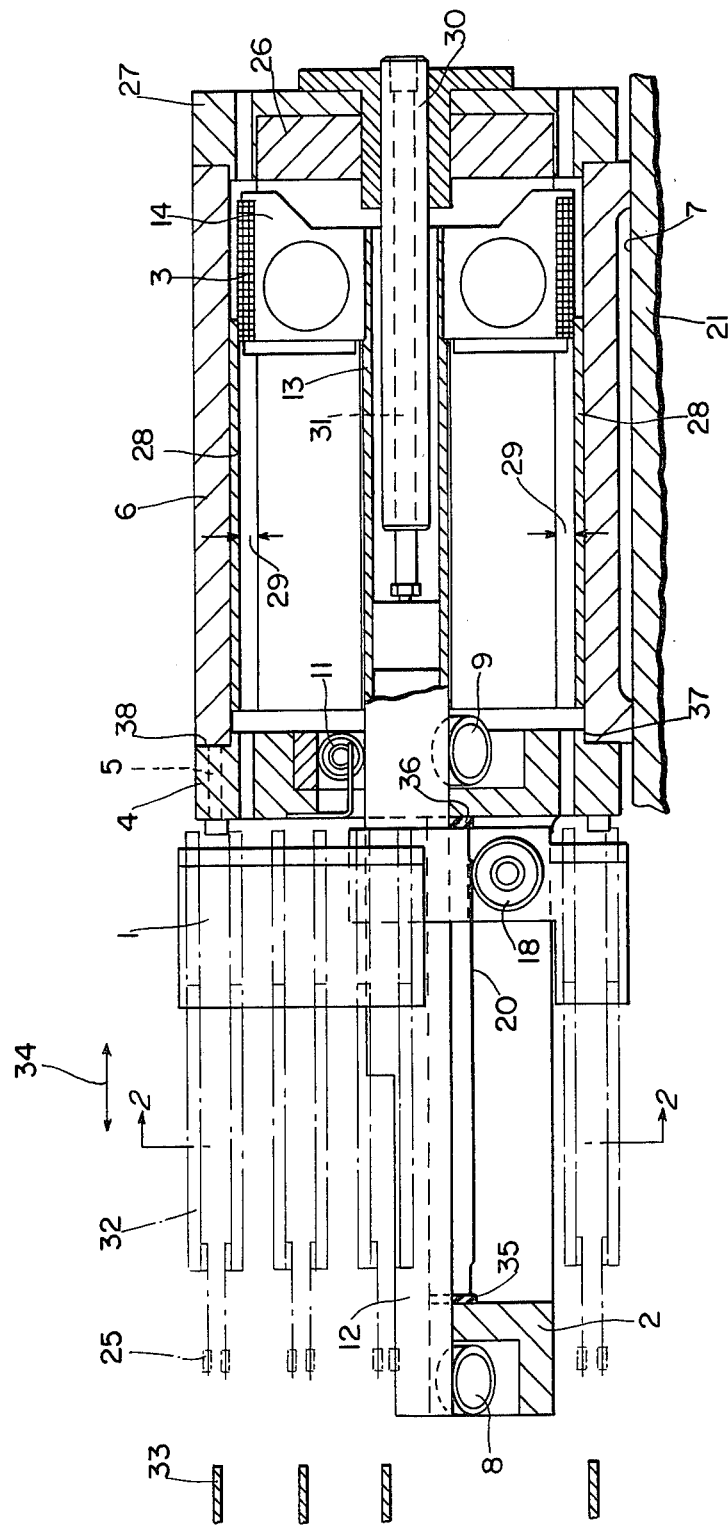

United States Patent [19]

Manzke et al.

[11] 4,319,354

[45] Mar. 9, 1982

[54] DEVICE FOR POSITIONING MAGNETIC HEADS IN MEMORY PROCESSING UNITS

[75] Inventors: Klaus Manzke, Westheim; Peter Hammerschmitt, Brühl; Richard Schneider, Heidelberg; Karl Uhl, Frankenthal, all of Fed. Rep. of Germany

[73] Assignee: BASF Aktiengesellschaft, Ludwigshafen, Fed. Rep. of Germany

[21] Appl. No.: 108,465

[22] Filed: Dec. 31, 1979

[30] Foreign Application Priority Data

Jan. 12, 1979 [DE] Fed. Rep. of Germany ... 7900695[U]

[51] Int. Cl.³ .............................................. G11B 21/08
[52] U.S. Cl. .................................................. 360/106
[58] Field of Search .................................. 360/106, 78

[56] References Cited

U.S. PATENT DOCUMENTS 3,470,399  9/1969  Johnson et al. ................ 360/106
4,166,284  8/1979  Daniels ............................ 360/106

FOREIGN PATENT DOCUMENTS 2304619  8/1973  Fed. Rep. of Germany .
1424622  2/1976  United Kingdom .

*Primary Examiner*—Robert S. Tupper
*Attorney, Agent, or Firm*—Keil & Witherspoon

[57] ABSTRACT

A device for positioning magnetic heads over preselected tracks on magnetic disks in memory processing units, the device consisting essentially of a linear electric motor, including a stationary, partially hollow magnetic device, and of a support member and a guide member which is mounted on the latter in an axially movable manner and is provided with at least one head mount for at least one head support, wherein the support member is mounted at one end of the magnetic device and is otherwise unsupported by the chassis of the memory processing unit.

7 Claims, 2 Drawing Figures

DEVICE FOR POSITIONING MAGNETIC HEADS IN MEMORY PROCESSING UNITS

The present invention relates to a device for positioning one or more magnetic heads over preselected tracks on magnetic disks in memory processing units, the device consisting essentially of a linear electric motor, including a stationary, partially hollow magnetic device, and of a support member and a guide member which is mounted on the latter in an axially movable manner and is provided with at least one head mount for one or more head supports.

Positioning devices with a linear motor are widely known, for example in the form of a moving coil system, as disclosed in German Laid-Open Application DOS No. 2,304,691, in which a tubular part can be moved on a coaxially disposed guide rod, and a hollow magnetic device of square cross section consists of four side parts and other connecting parts of magnetically permeable metal. This first magnetic device is enclosed by a closed second magnetic device having large magnetic poles, an air gap thus being formed between the two magnetic devices, and the moving coil moving in this gap.

The known positioning device is accordingly of very complicated design and hence cannot be manufactured economically, and its weight and volume are excessive.

It is an object of the present invention to provide a device which can be produced economically, has extremely short positioning times and hence correspondingly short access times, and exhibits improved vibration characteristics whilst being extremely compact.

We have found that this object is achieved with a positioning device, wherein the support member is mounted at one end of the magnetic device and is otherwise unsupported by the chassis of the disk drive. This greatly simplifies assembly of the positioning device, and the device is insensitive to temperature fluctuations which would have an adverse effect in the form of expansion and contraction of materials.

Figure 2:
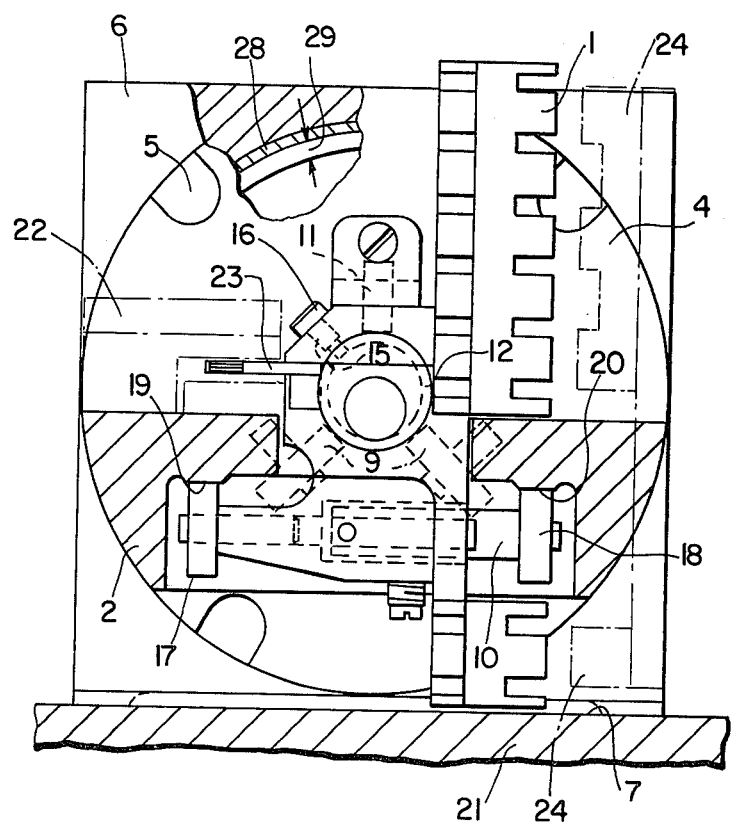

Further details of the invention are disclosed in the following description of an embodiment of the positioner illustrated in the accompanying drawings, in which FIG. 1 is a schematic side elevation, partly in section, of a head positioning device according to the invention for use in a disk file, and FIG. 2 is a schematic front elevation of the device of FIG. 1, partly in section, taken along line A–B in FIG. 1.

Essentially, the positioning device consists of the linear motor in the form of a moving coil drive system, and of a guide unit carrying the head or heads.

The moving coil drive consists essentially of the permanent magnet device and the motor coil 3. The guide unit consists essentially of a fixed support member 2 and of an axially movable guide member carrying the head mount 1. The support member 2, the guide member, the head mount 1 and the coil are advantageously in the form of a single assembly, i.e. they can be pre-assembled independently of the other individual components of the positioner. A second assemlby is advantageously formed by the magnetic device. In order to achieve low mass at the same time as high strength, the guide member is advantageously in the form of a tube 12 which carries the motor coil 3 and the head mount 1. The support member 2 is advantageously attached to the magnetic device by means of a fitting flange 4 and screw connections 5. The magnetic device comprises an outer flux-conducting member 6 with a square contour, and a central bore and is provided with grooves running its entire length. The outer flux-conducting member 6 is closed at one end by part 27, an inner flux-conducting member 26 being attached to the end part 27. The flux-conducting members 6, 26 and 27 are mounted on surface 7 of the chassis 21. For the guidance of the guide tube 12, the support member 2 is advantageously provided with antifriction bearings, e.g. seven roller bearings of which five are fixed, the other two being movable. Two pairs (8 and 9) of the five fixed bearings are inclined and disposed behind one another, at the greatest possible distance apart, at the two ends of the support member and parallel to the mounting surface. Opposite the rear pair of bearings 9 there is provided a spring-loaded fixed bearing 11 which acts in opposition to the bearings 9 (see FIG. 2). The guide tube 12 moves on these bearings in the axial direction of the motor, the energy required to effect movement being generated by the magnetic field created by the energized coil 3 and the magnetic device. The coil 3 is attached to a ring-shaped core 14, having, for example, three spokes, at the end 13 of the guide tube 12. The coil windings advantageously consist of aluminum foil. The head mount 1 is fastened to the guide tube 12, about halfway along the latter, by means of screws 16 which snugly fit in bores 15. The carriage member 10, to which the two roller bearings 17 and 18 are attached, is mounted on the underside of the head mount 1. The carriage member 10 runs on bearings 17 and 18 along the guide tracks 19 and 20 on the underside of the support member 2. The bearing 18 is spring-loaded and thus pulls the guide tube 12 with constant force against the pairs of fixed bearings 8 and 9. The carriage member 10 with bearings 17 and 18 is advantageously mounted directly on the head mount 1. Due to its design, the carriage member 10 prevents the guide tube from rotating, so that the latter can move only in a horizontal plane of the support member 2 and not in a plane vertical thereto. The support member 2, which is attached to the magnetic device by means of fitting flange 4 and screws 5 and is, therefore, fixed in position, is provided with the pairs of fixed bearings 8 and 9 and carries the surface-treated and wear-resistant guide tracks 19 and 20.

The support member 2 is of cantilever construction since it is joined to the magnetic device only via the fitting flange 4 and the screws 5 and otherwise has no contact either with the magnetic device or with the chassis. The position of the support member 2 with respect to the mounting surface 7 is determined by the collar 27 and an annular mating surface 38 on the fitting flange. If desired, the support member 2 can simultaneously accommodate an optical positioning system and a cam tower 24 for loading magnetic heads 25 via ramps. Apart from the flux-conducting members 6, 26 and 27, the permanent magnet system consists of one or more permanent magnets 28.

The outer flux-cconducting member 6 with a square contour is provided with a circular bore, for example by drilling or milling, and on its inner wall the magnet or magnets 28 are mounted; for example, small flat strips of permanent magnet material 28, held in grooves, are used, but ring magnets can also be employed. The permanent magnet material advantageously has a high energy product and a low demagnetization factor. The rear end of the outer flux-conducting member is closed by a square flange 27, in the middle of the inner flat surface of which the inner flux-conducting member 26 is fastened. As a result of the circular bore in the flux-conducting member 6, an annular working air gap 29 is produced. The working air gap has an axial length which corresponds to the sum of the stroke of the linear motor and the length of the motor coil 3. There is a radially oriented magnetic field present in the working air gap. A tachometer consists of the rod-shaped permanent magnet 31 and the hollow cylindrical coil 30 which is firmly attached to the flange 27. The coil 30 projects axially into the rear part of the guide tube 12. The rod magnet 31, which moves together with the guide tube 12, is mounted inside the latter.

The way in which the device functions is explained below:

The head supports 32, with the magnetic heads 25 attached thereto, are mounted on the heat mount 1. The heads 25 are intended to be moved rapidly and accurately, with the aid of the positioning system 22, 23, over the surface of the magnetic disk 33 and to be aligned with respect to preselected tracks thereon. For this purpose the head supports 32 on the head mount 1 move linearly in the direction indicated by double arrow 34 and radially with respect to the magnetic disks 33. The maximum travel of the heads 25 is predetermined by the dimensions of the magnetic disk 33 and advantageously corresponds to the maximum stroke of the linear motor.

When current is applied to the motor coil 3 of the moving coil drive, an axial propelling force is exerted on the guide tube 12 and thus causes the head mount 1, the head supports 32 and the heads 25 to move forward or backward in the direction indicated by double arrow 34, depending on the direction of current flow.

By sensing the speed of movement, it is possible to brake the head 25 in good time before it reaches the preselected track and, accordingly, to position it accurately thereover. When the heads 25 are moved out of the data track area, stops 35 and 36 determine the end positions of the carriage member.

After the preselected track has been found, the heads 25 are held in position by the moving coil drive, by supplying the latter continuously with current in alternating directions. Selection of the track and positioning of the head 25 over it is effected via a magnetic servo track or an optical system 22, 23.

In order to avoid mechanical vibrations, and to achieve easy and jolt-free running, the device is of sturdy mechanical construction. The point at which the propelling force is applied to the assembly of moving parts is located at least in the vicinity of the center of gravity of the guide member 12.

In order to exert a uniform maximum force on the guide member 12, a permanent magnet system is uniformly distributed around the entire periphery of the toroid motor coil 3, so that a uniform magnetic flux is obtained in the whole working air gap 29. Since the guide tube 12, reciprocating in the center of the linear motor, is firmly connected to the motor coil 3, the motor coil 3 is located centrally in the working air gap 29. The geometric center of the guide tube 12, of the core 14 of the coil, and of the motor coil 3 approximately coincides with the center of gravity. The guide tube 12 is used as support for the head mount 1 and the head systems 25 and 32, the mass of which is as far as possible distributed uniformly around the center of the guide tube.

Since the support member 2 projects like a cantilever from the front end of the linear motor and is not directly connected to the chassis 21, it can expand and contract in a stress-free manner when changes in temperature occur and it is unnecessary to match the material of the support member 2 to that of the chassis 21. In the above-described embodiment, the fitting flange 4 is integral with the support member 2, but it can, of course, also be designed as a separate component.

It is also advantageous that the permanent magnet device has no guiding function at all and, over its entire length, does not have any recesses or apertures for guide members, so that a coherent working air gap 29 of maximum dimensions is obtained, which ensures, in the case of a motor having small external dimensions, maximum utilization of the available power. A further advantage of the positioning device of the invention is that it consists of only two assemblies which can be fitted together independently of one another, one assembly being formed by parts 6, 26, 27, 28 and 30 and the other assembly by the moving parts. The two assemblies are joined together and positioned with respect to one another only by means of a collar 37 and four screws 5, so that only the surface 38 has to be machined as a mating surface. In spite of this, high demands on accuracy can be met by the device of the invention.

We claim:

1. A device for positioning one or more magnetic heads over pre-selected tracks on magnetic disks in a memory processing unit having a chassis, the device comprising a linear electric motor having a moving coil within a stationary, partially hollow magnetic device, a support member, a guide member which carries said coil and at least one head mount means mounting said guide means on the support member for axial movement wherein the movement of the coil is axially limited to the confines of the magnetic device, wherein the support member is mounted at one end of said magnetic device in cantilever fashion and is otherwise unsupported by said chassis, and extends outwardly from said device substantially within the cross-sectional area defined by the diameter of said coil and in coaxial relationship to said guide member and said coil.

2. A positioning device as claimed in claim 1, wherein said guide member is in the form of a guide tube carrying said coil, said mounting means including three antifriction bearings extending radially inwardly from said support member at a spacing from each other of approximately 120°.

3. A positioning device as claimed in claim 2, wherein at least partially mounted inside said guide tube there is a tachometer having two relatively movable parts, one of said parts being attached to the other end of said magnetic device and the other part being attached to said guide tube so as to be movable therewith.

4. A positioning device as claimed in claim 1, wherein the guide member is additionally provided with a carriage member, and wherein said support member has guide tracks cooperating with said carriage member in supporting said guide member, thereby to prevent said guide member from moving in a plane perpendicular to the horizontal plane of the support member.

5. A positioning device as claimed in claim 4, wherein the carriage member is disposed below, and directly mounted on, the head mount.

6. A positioning device as claimed in claim 1 or 2, wherein said magnetic device comprises flux-conducting members including a hollow flux-conducting member, and wherein at least one magnet is attached to the hollow flux-conducting member, said magnet being of a permanent magnet material having a high energy product and a small de-magnetization factor.

7. A positioning device as claimed in claim 6, wherein the thickness of said magnet or magnets is small with respect to the thickness of the flux-conducting member.

* * * * *